United States Patent [19]

Schnell

[11] 4,283,284
[45] Aug. 11, 1981

[54] HOLLOW FIBER DIALYZER END SEAL SYSTEM

[75] Inventor: William J. Schnell, Wheeling, Ill.

[73] Assignee: Baxter Travenol Laboratories, Inc., Deerfield, Ill.

[21] Appl. No.: 58,589

[22] Filed: Jul. 18, 1979

[51] Int. Cl.³ .............................................. B01D 31/00
[52] U.S. Cl. .................. 210/321.3; 210/450; 156/69
[58] Field of Search ............ 165/167, 158; 210/22, 210/456, 450, 321 A, 321 B, 321 R, 433 M; 264/258; 156/172, 173, 433, 69

[56] References Cited

U.S. PATENT DOCUMENTS

| | | | |
|---|---|---|---|
| 3,277,959 | 10/1966 | Withers | 165/180 X |
| 3,442,002 | 5/1969 | Geary, Jr. et al. | 29/450 |
| 3,882,024 | 5/1975 | Holmes et al. | 210/321 |
| 4,031,012 | 6/1977 | Gics | 210/321 A |
| 4,047,563 | 9/1977 | Kurata | 165/158 |
| 4,075,100 | 2/1978 | Furuta et al. | 210/456 X |
| 4,157,114 | 6/1979 | DeLorenzo | 165/158 |
| 4,190,411 | 2/1980 | Fujimoto | 264/311 |
| 4,201,673 | 5/1980 | Kanno et al. | 210/321 B |

Primary Examiner—Frank A. Spear, Jr.
Attorney, Agent, or Firm—Paul C. Flattery; Garrettson Ellis

[57] ABSTRACT

A hollow fiber diffusion device comprises a bundle of hollow fibers disposed in a generally rigid, tubular housing having relatively diametrically enlarged manifold members adjacent opposite housing ends. In accordance with this invention, a relatively resilient plastic sleeve member is carried at each end of the housing and sealed to it. Each sleeve member carries an added inner sleeve of less inner diameter than the inner sleeve, being coaxially positioned with the housing to receive, hold, and center the ends of the bundle. Preferably, the sleeve is made of a material which sealingly adheres to the potting compound to facilitate the sealing of the system.

22 Claims, 5 Drawing Figures

HOLLOW FIBER DIALYZER END SEAL SYSTEM

BACKGROUND OF THE INVENTION

Capillary fiber dialyzers are sold in large quantities by various companies for use as artificial kidneys for the dialysis of blood. Typically, these various commercial devices comprises a bundle of hollow fibers disposed in a generally rigid tubular housing, with the bundle and housing having relatively diametrically enlarged manifold members adjacent opposite housing ends. A sealing cap is then placed on each housing end, with the sealing cap defining a central port for the flow of blood from end to end of the housing, passing through the bores of the hollow fibers in the bundle.

Dialysis solution passes through the bundle of fibers in contact with the exterior surfaces of the individual fibers, entering the housing through a side port in one of the enlarged manifold members, and being withdrawn from another port in the side of the other enlarged manifold member. The ends of the bundle of hollow fibers are potted with a urethane material or the like, to stabilize the fibers and to secure them in a single mass, with the bores of the fibers being exposed to permit flow communication along their lengths. Frequently, an O-ring is provided between the end of the manifold member and the end closure member, to provide a hermetic seal.

In the conventional techniques of manufacturing hollow fiber dialyzers, the bundles of fragile fibers, upon assembly into dialyzers, exhibit a substantial number of instances of fiber breakage, occurrence of short fibers, and the like which results in leaking units which must be discarded or repaired. Often, some of the fibers misalign, and flare out into the enlarged manifold member, when they should remain in a discrete bundle during the potting process. This can result in a leakage situation, for even a single leaking fiber must result in the scrapping of the entire dialyzer unless it can be repaired.

The unit cost of dialyzers is increased by the need in many designs of a separate O-ring at its end for sealing. Also, the O-ring is conventionally compressed as the end closure member is applied to provide the seal. However, in the case of a vinyl O-ring or another material which is subject to cold flow upon storage, the dialyzer may lose its sealing capabilities provided by the O-ring because of the cold flow of the ring material in response to the compressive forces. The result of this is that the seal itself is weakened, and small amounts of blood may leak from the end closure of the dialyzer.

In accordance with this invention, an improved sealing system is provided in which a resilient sealing member is not placed under significant initial compression, so that significant cold flow does not take place upon storage. As a result of this, dialyzers in accordance with this invention may be stored indefinitely without a significant diminution of their good end sealing capabilities.

A capillary fiber diffusion device is provided herein which may be made with a significantly lower scrap rate, greatly reducing the unit cost of the dialyzer, which also has improved shelf life with respect to its end seals, and an intrinsically lower cost because a separate, preformed O-ring is not necessary in the designs proposed.

DESCRIPTION OF THE INVENTION

In this invention, a hollow fiber diffusion device comprises a bundle of hollow fibers disposed in a generally rigid, tubular housing, with the bundle and housing having relatively diametrically enlarged manifold members adjacent opposite housing ends. The bundle and housing are sealed at their respective opposite ends.

In accordance with this invention, a relatively resilient plastic sleeve member is carried at each end of the housing and sealed to it. Each sleeve member carries an added inner sleeve of less inner diameter than the inner diameters of the manifold members, the inner sleeve being coaxially positioned with the housing to receive, hold, and center the ends of the bundle. Preferably, the inner sleeve has an inner diameter which is essentially the same as the inner diameter of central portions of the tubular housing, to firmly retain the hollow fiber bundle.

The inner sleeve may be filled with potting compound which is interspersed through the exterior surfaces of the fibers of the bundle to support the bundle, while permitting the apertures of the fibers to communicate through the potting compound.

The inner sleeve is made of a material which sealingly adheres to the potting compound. Accordingly, a strong seal is formed between the potting compound and the inner sleeve. For example, the potting compound may be a compatible urethane material, and the inner sleeve may be a polyvinyl chloride thermoplastic material.

The relatively resilient plastic sleeve which carries the inner sleeve also may define an outer sleeve which fits in telescoping relation into the inner surface of the enlarged manifold members, and may be sealed thereto by solvent sealing or the like. Accordingly, a solid, complete seal of the inner ends of the dialyzer is provided, forcing all fluid passing from end to end of the dialyzer to pass through the bores of the fibers, which are centered and held by the inner sleeve.

The diffusion device of this invention is typically contemplated to be a dialyzer for blood. However, it is understood that it may also be utilized as an oxygenator for blood, an ultrafiltration device, a reverse osmosis module, a membrane plasmapheresis device, or the like.

Typically, the ends of the housing may each be sealed by means of an attached end closure member. The end closure member may define a central port, as well as an inwardly pointing, annular sealing ring positioned to sealingly press against the end of the inner sleeve. The effect of this is to define a manifold in the interior area of the sealing ring which provides communication between the central port and the interiors of the fibers of the bundle and has a very low volume, which is particularly desirable in the processing of blood.

Additionally, the end closure members utilized in this invention may define a plurality of eccentrically-positioned sleeves adapted for communication with the exterior space about the inner sleeve and the sealing ring. These eccentrically-positioned sleeves can define access ports to permit extrusion of an O-ring into the area about the annular sealing ring, to form an O-ring seal about said sealing ring which is not substantially compressively stressed. Thus, the seal will not be subject to significant cold flow on storage to compromise the quality of the seal.

Also, the eccentrically positioned sleeves may be used as torquing lugs, if desired, to place a threaded closure on a threaded housing end for sealing, or for opening the closure member, if such is necessary, for a repair operation or an inspection during manufacture.

The hollow fiber diffusion device of this invention may be manufactured by applying the relatively resilient plastic sleeve member, which has a closed end, to each end of the housing and sealing it within the housing end. An end of the bundle of hollow fibers is inserted into each inner sleeve, which inner sleeve is spaced radially inwardly of the remainder of the plastic sleeve member, and coaxially positioned within the housing to hold and center the bundle ends. The inner sleeve preferably defines the closed outer end.

Potting compound is then applied to the ends of the bundle to permeate and enclose the bundle ends within the sleeve. This may be done by rotating the dialyzer so that the ends of the housing revolve around the rotational center, while simultaneously applying the potting compound through the side dialysate ports from where it migrates radially outwardly to the bundle ends, to fill the closed-end inner sleeves to the desired level. Conventional potting compounds, such as polyurethane formulations, used in the commercial manufacture of hollow fiber dialyzers may be used in this invention.

After the potting compound has cured, the outer end of the inner sleeve and the outermost portion of the fiber bundle end may be sliced away, to expose the open bores of the individual fibers of the bundle. The inner sleeve is preferably made of a material such as a polyvinyl chloride formulation which is easily cut by a slicing instrument.

After this, the end closure member which defines a central port and an inwardly pointing, annular sealing ring may be attached to each end of the housing. In one specific embodiment, the end closure may be twisted on by a conventional interlocking screw thread arrangement. However, solvent sealing or other techniques are also contemplated for sealing of the closures to the housing.

The sealing ring is proportioned to sealingly press against the cut end of the inner sleeve. It may be solvent-sealed against the cut end of the inner sleeve for permanent and improved sealing, if desired, or sealed by any other means. The effect of this is to define a manifold chamber within the annular sealing ring, for communication between the central port and the bores of the bundle fibers.

As described above, sealant material may then be applied through port means in the end closure to form a sealant ring about the exterior of the sealing ring. Since the sealant ring may be relatively uncompressed since it is formed in situ, the quality of its seal does not significantly deteriorate by cold flow upon storage.

Referring to the drawings, FIG. 1 is a perspective view of a hollow fiber dialyzer in a semifinished stage of manufacture, showing the attached, relatively resilient plastic sleeve member of this invention carried at the ends of the housing.

Figure 1:
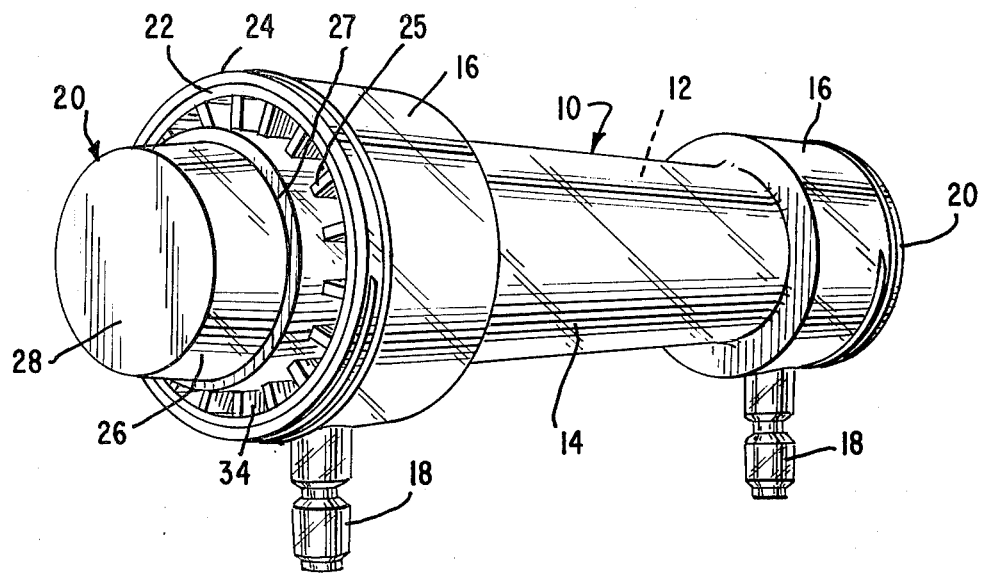

Referring to the drawings, a hollow fiber diffusion device 10, which is specifically shown to be a dialyzer for blood, comprises a bundle of hollow fibers 12 of a conventional type used in hollow fiber dialyzers, disposed in a generally rigid, tubular housing 14 of a design generally similar to commercial hollow fiber dialyzers, except as otherwise described herein.

Housing 14 carries at its opposed ends a pair of relatively diametrically enlarged manifold members 16, each of which defines a conventionally designed dialysis solution access port 18, one of which is the inlet and the other the outlet for dialysis solution. Manifolds 16 permit the relatively uniform flow distribution and collection of dialysis solution prior to and immediately following its trip through the bundle of fibers 12 in contact with the exterior surfaces of the fibers.

Figure 2:
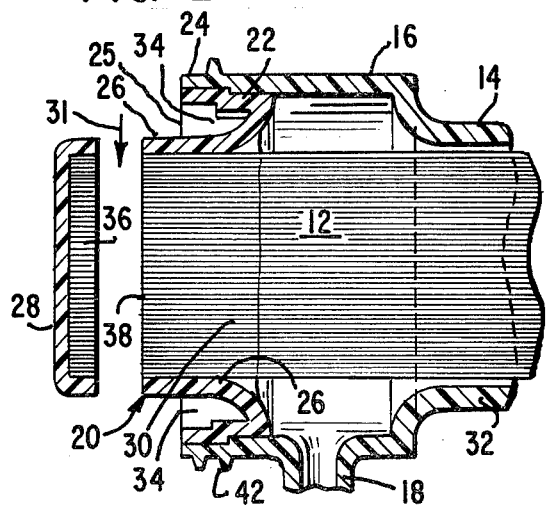
FIG. 2 is a longitudinal sectional view of an end of the dialyzer of FIG. 1 showing how, after the potting of the fiber bundle, an end portion of the relatively resilient plastic sleeve member may be sliced away to expose the open fibers of the bundle embedded in potting compound.

In accordance with this invention, a relatively resilient plastic sleeve member 20 is carried at each end of the housing 14 and is sealed thereto conventionally by solvent sealing or the like at the interface between outer sleeve 22 of sleeve member 20 and the annular end 24 of the tubular housing, as particularly shown in FIG. 2.

Each sleeve member 20 carries an added inner sleeve 26, with sleeve member 20 defining, preferably at inner sleeve 26, a closed end 28. As shown in the drawings, inner sleeve 26 is of less inner diameter than the inner diameters of the manifold members 16, with inner sleeve 26 being coaxially positioned with housing 14 to receive, hold and center the ends of bundle 12.

Each inner sleeve may contain a mass of potting compound 30 which is interspersed throughout the exterior surfaces of the fibers of bundle 12. Inner sleeve 26 and preferably the entire sleeve member 20, which may be a single molded piece, may be made of a resilient material such as a polyvinyl chloride plastic formulation which sealingly adheres to potting compound 30, which in turn, may be a urethane formulation or a similar material capable of bonding with the material of inner sleeve 26. Accordingly, the ends of bundle 12 are firmly secured in a tightly sealed, potted mass.

Preferably, the inner diameter of inner sleeve 26 is essentially the same as the inner diameter of central portions 32 of the tubular housing. Also, it is preferable for at least part of inner sleeve 26 to be spaced radially inwardly from the enlarged manifold ends 16 of housing 14 to define an open space 34 about the radially outer surface of the inner sleeve 26. This open space can be seen in FIG. 2, while in FIG. 4 it is indicated at 68.

Inner sleeve 26 may define a slight step 27, while reinforcement members 25 are positioned between inner sleeve 26 and outer sleeve 22.

Potting compound may be applied to the ends of the dialyzer in accordance with Schnell U.S. patent application Ser. No. 928,477, filed July 27, 1978, which shows how the sealant may be inserted by spinning the dialyzer so that manifold chambers 16 spin around the center of rotation while simultaneously inserting the potting compound through ports 18 until inner sleeve 26 is filled to the desired level. Thereafter, the potting compound 30 is allowed to cure. One then transversely slices through the inner sleeve 26 at point 31 with a cutting blade or the like, to remove the closed end 28 and the potted end portion 36 of bundle 12, to expose the open bores of the fibers at the new shortened end 38 of bundle 12.

Figure 3:
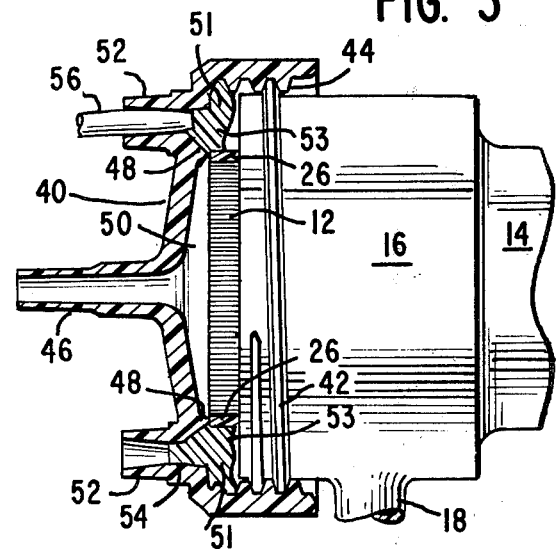
FIG. 3 is a fragmentary elevational view, taken partly in longitudinal section, showing how an end closure member in accordance with this invention may be attached to the end of the housing to complete the assembly of the dialyzer.

Following this, an end closure member 40 may be applied to the end of dialyzer 14, as shown in FIG. 3. The specific embodiment shown for application of the end closure member 40 are the mating screw threads 42, 44, although other sealing techniques such as heat sealing or solvent sealing may be used as well.

End closure 40 defines a central aperture 46 in the conventional manner of an end closure of a hollow fiber dialyzer. In accordance with this invention, the end closure member 40 also includes an inwardly pointing annular sealing ring 48, which is positioned as shown in FIG. 3 to press against the end of the inner sleeve 26. If desired, an organic solvent such as methylisobutylketone may be applied to the sealing ring 48 and/or the end of inner sleeve 26 to provide a solvent seal bond between the outer closure 40 and the inner sleeve 26. Outer closure 40 may be made of a polystyrene-based plastic material, with other copolymer ingredients added as desired, which material is readily solvent sealable to the preferably vinyl plastic material of inner sleeve 26.

As the result of this, a small manifold chamber for blood 50 is provided, for communication between central aperture 46 and the interiors of the bores of fiber bundle 12, in which manifold chamber 50 is of substantially less diameter than the overall inner diameter of end closure member 40. The effect of this is to reduce the blood volume of the dialyzer, which is clearly desirable, as well as to avoid peripheral, stagnant areas, where blood in a manifold faces a wall of potting compound which surrounds bundle 12. Also, in accordance with this invention, the amount of potting compound which is needed at each end is greatly reduced, since the potting compound is retained by the inner sleeve, which is spaced radially inwardly from the inner wall of the manifold chamber.

End closure 40 may also define a plurality of eccentrically positioned projecting members or preferably sleeves 52, which are adapted for communication with the exterior space about sealing ring 48 within end closure 40. Projecting members 52 may be used as torquing lugs to facilitate the application of the end closure 40. However, when desired, partitions 54, which are found in sleeves 52, may be broken through (or not provided in the first place) to permit injection nozzles 56 to communicate with the annular exterior space 51 positioned outside of inner sleeve 26 and sealing ring 48, to extrude an O-ring 53 made of sealant, to fill exterior space 51. This O-ring 53 in space 51 can reliably exercise its sealing function without being under such a level of compression that it may tend to cold flow upon storage. As a result, the dialyzers of this invention can exhibit a longer shelf life.

However, in the embodiment of FIG. 3, it may not be necessary to utilize O-ring 53, since the solvent seal between sealing ring 48 and inner flange 26 can provide an adequate hermetic seal for the blood flow path through aperture 46.

Figure 5:
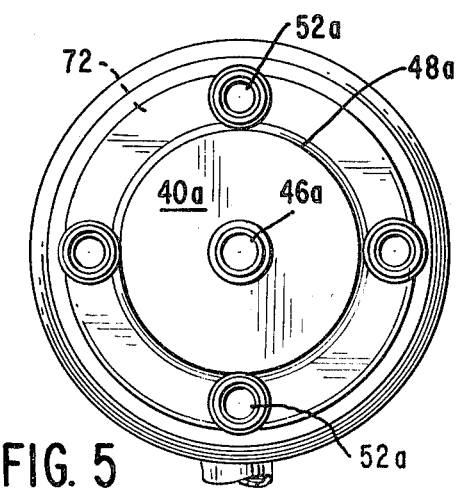
FIG. 5 is an end elevational view of the dialyzer of FIG. 4, after the step of slicing away an end portion of the relatively resilient plastic sleeve member and application of an end closure for sealing the dialyzer end.
Figure 4:
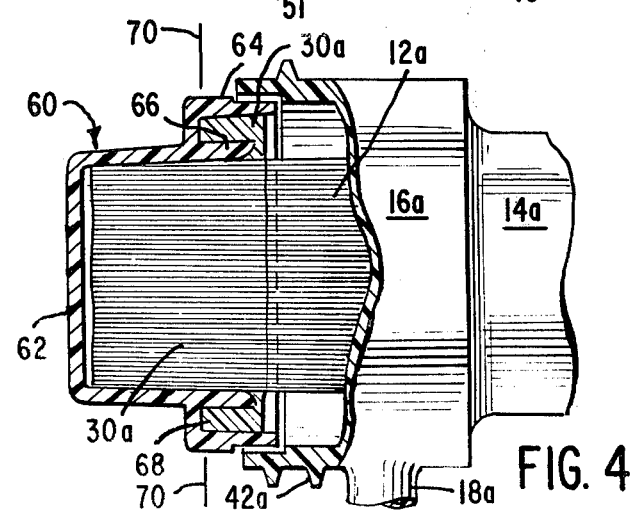
FIG. 4 is a fragmentary elevational view, taken partly in longitudinal section, of an alternative embodiment of the dialyzer of FIG. 1 showing a different design of the relatively resilient plastic sleeve.

Referring to FIGS. 4 and 5, a different embodiment of dialyzer and seal is disclosed in accordance with this invention. Dialyzer housing 14a having enlarged manifold ends 16a and access ports 18a are disclosed as in the previous design. A different design of preferably polyvinyl chloride plastic sleeve member 60 is used, having a closed end 62 as before, and defining an outer sleeve 64 and an inner sleeve 66, defining an annular aperture 68 positioned between them which faces inwardly toward housing 14a, rather than outwardly in the manner of the corresponding space 34 in the embodiment shown in FIG. 2. Fiber bundle 12a is present, as is potting compound 30a, applied in the manner of the previous embodiment, and shown to fill annular aperture 68 as well as inner sleeve 66.

In this instance, after curing of the potting compound 30a, plastic sleeve member 60 may be transversely severed across both of its sleeves 64, 66 at slicing line 70-70, to separate the portion of sleeve member 60 which contains closed end 62 from the rest of the dialyzer, and to expose sleeves 64, 66 and sealant 30a therebetween. Thereafter, an end closure member 40a which may be of a design identical to closure member 40, is applied by rotation about screw threads 42a to bring sealing ring 48a into sealing contact with the end of the inner sleeve 66, as in the previous embodiment.

It may be desired to not use a solvent seal between ring 48a and inner sleeve 66, but instead to rely upon an extruded O-ring 72, which may be inserted into the area outside of sealing ring 48a under end closure 40a by extrusion through ports 52a in the manner previously described. O-ring 72 communicates with the sealant in annular space 68, and may form a tight adhesive bond with it, as well as bonding to the peripheral interior areas of end closure 40a, providing a firm, relatively uncompressed end seal, in which the sealant flows into exact sealing conformity with every irregularity of shape present, thus eliminating the need for a pressure seal which may cold flow.

The above has been offered for illustrative purposes, and is not intended to limit the invention of this application, which is as defined in the claims below.

What is claimed is:

1. In a hollow fiber diffusion device which comprises a bundle of hollow fibers enclosed in a generally rigid tubular housing, said housing having relatively diametrically enlarged manifold members adjacent opposite housing ends, and being sealed at said opposite ends, the improvement comprising, in combination:

a relatively resilient plastic sleeve member carried at each end of said housing and sealed thereto, each sleeve member carrying an integral added inner sleeve of less inner diameter than the inner diameters of the manifold members, said inner sleeves being spaced radially inwardly of the remainder of said plastic sleeve member to define a space therebetween open at one end and coaxially positioned with said housing to receive, hold and center the ends of said bundle, said inner sleeve containing a mass of potting compound which is interspersed throughout the exterior surfaces of the fibers of said bundle, said inner sleeve being made of a material which sealingly adheres to said potting compound.

2. The diffusion device of claim 1 in which said sleeve member and inner sleeve are made of a polyvinyl chloride plastic, and the potting compound is a polyurethane.

3. The diffusion device of claim 2 in which said ends of the housing are each sealed by means of an attached end closure member, said closure member defining a central port, and an inwardly pointing annular sealing ring positioned to sealingly press against the end of said inner sleeve.

4. The diffusion device of claim 3 in which said closure members define a plurality of eccentrically positioned sleeves adapted for communication with the exterior space about said sealing ring, and an extruded O-ring filling said exterior space.

5. The diffusion device of claim 4 in which the inner diameter of said inner sleeve is essentially the same as the inner diameter of central portions of said tubular housing.

6. The diffusion device of claim 3 in which said inner sleeve defines an open space about the radially outer surface of said inner sleeve which is surrounded by said housing end.

7. The diffusion device of claim 3 in which an extruded O-ring fills said exterior space about said annular sealing ring.

8. The diffusion device of claim 1 in which the inner diameter of said inner sleeve is essentially the same as the inner diameter of central portions of said tubular housing.

9. In a hollow fiber diffusion device which comprises a bundle of hollow fibers disposed in a generally rigid, tubular housing, said housing having relatively diametrically enlarged manifold members adjacent opposite housing ends, and being sealed at said opposite ends, the improvement comprising, in combination:

a relatively resilient plastic sleeve member carried at each end of said housing and sealed thereto, each sleeve member carrying an added integral inner sleeve of less inner diameter than the inner diameters of the manifold members, each inner sleeve being spaced radially inwardly of the remainder of said plastic sleeve member to define an open space therebetween and coaxially positioned with said housing to receive, hold, and center the ends of said bundle, in which the ends of the housing are each sealed by means of an attached end closure member, said closure member defining a central port, and an inwardly pointing, annular sealing ring positioned to sealingly press against the end of said inner sleeve.

10. The diffusion device of claim 9 in which said inner sleeve defines an open space about the radially outer surface of said inner sleeve which is surrounded by said housing end.

11. The diffusion device of claim 10 in which the inner diameter of said inner sleeve is essentially the same as the inner diameter of central portions of said tubular housing.

12. The diffusion device of claim 11 in which said closure members define a plurality of eccentrically positioned sleeves adapted for communication with the open space about said annular sealing ring, and an extruded O-ring filling said open space.

13. The diffusion device of claim 12 in which said sleeve member and inner sleeve are made of a polyvinyl chloride plastic and the potting compound is a polyurethane.

14. The diffusion device of claim 10 in which an extruded O-ring fills said open space for sealing thereof.

15. The diffusion device of claim 9 in which said inwardly pointing, annular sealing ring is essentially of equal diameter to said inner sleeve, the end of said inner sleeve facing said sealing ring being free of flange members, the sealing ring pressing directly against the facing end of said inner sleeve.

16. The method of sealing the end of a hollow fiber diffusion device which comprises a bundle of hollow fibers disposed in a generally rigid, tubular housing which carries a plastic sleeve member at said end, which method comprises:

inserting an end of said bundle of hollow fibers into an inner sleeve radially inwardly of and integral with the remainder of said plastic sleeve member to define an open space therebetween, said inner sleeve being coaxially positioned with the housing to hold and center the end of said bundle, said inner sleeve defining a closed outer end;

applying potting compound to the end of said bundle to permeate and enclose the bundle end within said inner sleeve, while rotating said housing to impel said potting compound toward said end;

allowing said potting compound to cure;

slicing away the outer, closed end of said inner sleeve and the outermost portion of said bundle end adjacent said inner sleeve to expose the bores of the individual fibers of the bundle;

and attaching to the end of said housing a closure member which defines a central port and an inwardly pointing, annular sealing ring, and positioning said sealing ring to sealingly press against the cut end of said inner sleeve to define a manifold chamber within said annular sealing ring for communication between the central port and the bores of the bundle fibers.

17. The method of claim 16 including the step of applying sealant material through added port means in the diffusion device to form a sealant ring about the exterior of said sealing ring which is relatively uncompressed.

18. The method of claim 16, applied to both ends of the hollow fiber diffusion device.

19. In a hollow fiber diffusion device which comprises a bundle of hollow fibers disposed in a generally rigid, tubular housing, said bundle and housing having relatively diametrically enlarged manifold members adjacent opposite housing ends, and being sealed at said opposite ends, the improvement comprising, in combination:

a relatively resilient plastic sleeve member carried at each end of said housing and sealed thereto;

an inner sleeve carried at each end of said housing, said inner sleeve being spaced radially inwardly of said plastic sleeve member to define a space therebetween, said inner sleeve being coaxially positioned with said housing to receive, hold and center the ends of said bundle, said inner sleeve containing a separate mass of potting compound sealed thereto which is interspersed throughout the exterior surfaces of the fibers of said bundle, said inner sleeve being made of a material which sealingly adheres to said potting compound; and an attached end closure member sealing each end, said closure member defining a port, and an inwardly pointing, annular sealing ring positioned to sealingly press against the end of said inner sleeve.

20. In a hollow fiber diffusion device which comprises a bundle of hollow fibers enclosed in a generally rigid, tubular housing, said housing having relatively diametrically enlarged manifold members adjacent opposite housing ends, and being sealed at said opposite ends, the improvement comprising, in combination:

a plastic sleeve member carried at each end of said housing and sealed thereto, an inner sleeve carried at each end of said housing of less inner diameter than the inner diameters of the manifold members, said inner sleeves being spaced radially inwardly of said plastic sleeve member to define a space therebetween and coaxially positioned with said housing to receive, hold and center the ends of said bundle, said inner sleeve containing a mass of potting compound which is interspersed throughout the exterior surfaces of the fibers of said bundle, said inner sleeve being made of a material which sealingly adheres to said potting compound, and said space between each plastic sleeve member and its related inner sleeve also containing potting compound adhering to both said inner sleeve and the plastic sleeve member, in which the ends of the housing are each sealed by means of an attached end closure member, said closure member defining a port, and an inwardly pointing, annular sealing ring positioned to sealingly press against the end of said inner sleeve.

21. The diffusion device of claim 20 in which an extruded, relatively uncompressed sealant ring fills the space surrounding said inwardly pointing annular sealing ring.

22. The diffusion device of claim 21 in which said attached end closure members define eccentrically defined sleeve means adapted for communication with the exterior space about said sealing ring and through which said sealant ring is extruded after placement of the closure member on the end of the diffusion device.

* * * * *